United States Patent [19]
Bush

[11] Patent Number: 5,949,416
[45] Date of Patent: Sep. 7, 1999

[54] METHOD FOR PROVIDING HELP INFORMATION FOR NESTED FUNCTIONS

[75] Inventor: Alan M. Bush, Capitola, Calif.

[73] Assignee: Borland International, Inc., Scotts Valley, Calif.

[21] Appl. No.: 07/706,399

[22] Filed: May 28, 1991

[51] Int. Cl.[6] .................................................. G06F 3/00
[52] U.S. Cl. .......................... 345/338; 707/503; 707/538
[58] Field of Search .................................... 395/155–161, 395/275, 701, 702, 703, 704, 705, 708; 340/721; 434/118; 345/326–358; 707/503, 904, 538

[56] References Cited

U.S. PATENT DOCUMENTS

| | | | |
|---|---|---|---|
| 4,622,013 | 11/1986 | Cerchio .................................... | 434/118 |
| 4,648,062 | 3/1987 | Johnson et al. ........................... | 395/157 |
| 4,789,962 | 12/1988 | Berry et al. ........................... | 395/157 X |
| 4,806,919 | 2/1989 | Nakayama et al. ...................... | 395/158 |
| 4,890,257 | 12/1989 | Anthias et al. ........................... | 395/158 |
| 4,899,276 | 2/1990 | Stadler .................................... | 340/721 |
| 4,964,077 | 10/1990 | Eisen ...................................... | 395/275 |
| 4,970,678 | 11/1990 | Sladowski et al. ..................... | 395/275 |
| 4,992,972 | 2/1991 | Brooks et al. ........................... | 395/155 |
| 5,029,113 | 7/1991 | Miyoshi et al. .......................... | 395/161 |
| 5,040,131 | 8/1991 | Torres ...................................... | 395/159 |
| 5,123,087 | 6/1992 | Newell .................................... | 395/155 |
| 5,155,806 | 10/1992 | Hoeber et al. ........................... | 395/157 |
| 5,157,768 | 10/1992 | Hoeber et al. ........................... | 395/157 |
| 5,179,654 | 1/1993 | Richards et al. ........................ | 395/157 |

OTHER PUBLICATIONS

Young, X Window Systems: Programming and Applications with XF, Prentice Hall, 1988, pp. 1–42.

Scheifler et al, "X Window System: C Library and Protocol Reference", MIT and Dec., 1988, pp. 1–117.

Tucker, "Programming Languages", McGraw–Hill, 1986, pp. 230–254, 350–381.

Falkner, "Funk Utilities", PC Mag, Apr. 12, 1988, p. 38.

Freedman et al, "New Lotus Era Dawns 1–2–3/6 Enters Beta", PC Week, Nov. 13, 1989, p1(2).

Brown, "Tornado", PC Mag, Nov. 27, 1990, p. 418(2).

Rizzo, "Language", PC Mag, Jul. 1989, p. 373(5).

*The Smart Spread Sheet with Business Graphics*, Innovative Software, Inc, 1987, pp. SR 3–1 to 4–16, SU 2–1 to 2–12.

*Quattro Pro, version 2.0*, (1) *User's Guide*, pp. 12–16, 60–66 and 69–72, and (2) @ Functions and Macros handbook, pp. 3–17, 1990.

Alan Feuer, et al., "The Worksheet Utilities," Funk Software, Inc., Jan. 1988, 1–61.

*Primary Examiner*—John E. Breene
*Attorney, Agent, or Firm*—John A. Smart

[57] ABSTRACT

A system and method for producing context sensitive prompts to assist the user with entry and editing of formulae in an electronic spreadsheet comprises a display device, a processing unit, an input device and memory. The display device preferably has a plurality of segregated viewports for displaying a general prompt and a context sensitive prompt. The memory further comprises function tables, a prompt generator, a prompt stack, and other routines. The prompt generator uses the function tables, the prompt stack, the cursor position and the string on the edit line to construct prompts for presentation on the display device. The preferred method for creating and displaying context sensitive prompts comprises the steps of: detecting movement of the cursor; scanning the string on the edit line until the cursor position is reached; pushing a function record on the prompt stack for each function invocation identified in the edit line; popping a function record from the prompt stack as the end of each function invocation is identified; producing a context sensitive and general prompt string; displaying the prompt strings in viewports on the display device.

9 Claims, 10 Drawing Sheets

METHOD FOR PROVIDING HELP INFORMATION FOR NESTED FUNCTIONS

BACKGROUND OF THE INVENTION

1. Field of the Invention

The present invention relates to systems and methods for interactively controlling and displaying information using computers. In particular, the present invention relates to a system and method for producing context sensitive prompts when inputting and editing formulae which compute information displayed in a matrix arrangement.

2. Description of Related Art

Computers are known for providing an environment where the user interacts with the computer using a display device and an input device. There are a variety of application programs in the prior art for the storage, manipulation and retrieval of data by the computer. These programs often display data in various forms on the display device and permit user manipulation of the data. For example, electronic spreadsheets are well known in the art.

Spreadsheets provide users with the ability to represent their data as a collection of information units called "cells." Cells are organized into a multidimensional matrix for purposes of addressing the display. Each cell has a formula which when evaluated, determines the cell's value. Cell formulae may be literal constants, references to the values of other cells or more complicted expressions involving operators and/or function invocations.

As application programs such as spreadsheets have become more developed, many new functions that users may perform on the data have been added. These functions have been added to satisfy the user's need to perform various mathematical, statistical and financial computations. Each function has a unique name or identifier to invoke the function. Each function often requires a particular number of parameters on which to operate. However, the addition of these new functions has increased the number of functions into the hundreds for a typical spreadsheet. Thus, it has become difficult for users to remember all the different functions, as well as the parameters for each function. Heirarchial nesting of function invocations also adds complexity for the user.

One problem with many programs in the prior art is accurately entering or editting the data for use by the program. This is especially a concern when entering or editing formulae invoving a function invocation in a spreadsheet. It is often difficult for the user to keep track of the portion of the formulae that is being presently input or edited. The inability to identify the formula components often causes users to introduce errors into a particular cell formula which affects the accuracy of the entire spreadsheet.

Another problem with prior art spreadsheets is the names used to invoke various functions. While some functions are descriptively named, most functions are identified by cryptic acronyms from which it is almost impossible to discern the function that will be performed. Thus, users need the information about the function that will allow them to identify the function, its operation and the required input or parameters.

While there have been attempts in the prior art to eliminate these problems, existing spreadsheets are only moderately successful in increasing user access to help and other functions. Many spreadsheets presently offer on-line help, however, the information provided is only nominally helpful, and the process of getting to the help information is very difficult. With most on-line help systems, the information is often limited to a single line of information and provides the user with only nominal assistance. However, the more significant problem is finding the help information. Many times a user knows that a program has the ability to perform a particular function, but the user does not know the name of the function. In this case, the user is forced to search through several screens of help to find the function desired. Even when a user knows the function, on-line help requires significant effort to obtain the pertinent information. For example, in searching for help for a function such as @RATE, the user will typically be required to perform several steps many with multiple key strokes to determine what operation the @RATE function performs and the parameters that must be passed to the function.

Thus, there is a need for a system and method for displaying information about particular function invocations while cell formulae containing them are being entered or edited.

SUMMARY OF THE INVENTION

A system and method are disclosed for creating and displaying context sensitive prompts to assist the user with entry and editing of data in an electronic spreadsheet. The system preferably comprises a computer with a display device, a processing unit, an input device and memory.

The display device preferably has a screen that is divided into a plurality of segregated viewports. A first viewport provides an area to display the values of cells in some part of the cell matrix. These values are the results of formulae evaluation. One cell in the matrix is identified as the current cell as its value is displayed and highlighted. A second viewport, referred to as the edit line, contains the formula for producing the value of the current cell. The present invention also provides a third and fourth viewports for displaying a context sensitive prompt and a general prompt, respectively. The information displayed in the third and fourth viewports is based on the formula in the edit line and the position of the cursor within the formula.

The memory further comprises function tables, a prompt generator, a prompt stack, and other routines. The prompt generator is used to construct prompts for presentation on the display device. The prompt generator uses the function tables, the prompt stack, the cursor position and the string on the edit line to produce the prompts displayed in the third and fourth viewports of the display. The prompt generator uses the processing unit to scan the formula displayed on the edit line and store information related to function invocations on the prompt stack as tokens of the formula are scanned. The processor then uses the prompt generator and the function tables to look up the prompts for the function invocation at the top of the prompt stack, when scanning is complete.

The preferred method for creating and displaying context sensitive prompts to assist the user with entry and editing of data in an electronic spread sheet comprises the steps of: detecting movement of the cursor; scanning the string on the edit line until the cursor position is reached; pushing a function record on the prompt stack for each function invocation identified in the edit line; popping a function record from the prompt stack as the end of each function invocation is identified; producing a context sensitive prompt string; displaying the prompt string in a viewport on the display device; generating a signal representing a general prompt string for the function record on the top of the stack and displaying the general prompt on a viewport of the display device.

DESCRIPTION OF THE PREFERRED EMBODIMENT

The present invention provides a context sensitive prompting system that displays information related to the formula text being entered. As the user interacts with the computer to select and complete cells or fields within a spreadsheet, the present invention provides a general and context specific prompt of information to enable the user to accurately edit and input cell formulae containing function invocations. The present invention provides these prompts based on the position of the cursor within the formula being entered or edited. For example, if the cursor is positioned within a function invocation then the prompts will display information about that function and highlight the specific parameter, if any, to whose definition a non-punctuation character would contribute if entered at the cursor position.

Figure 1:
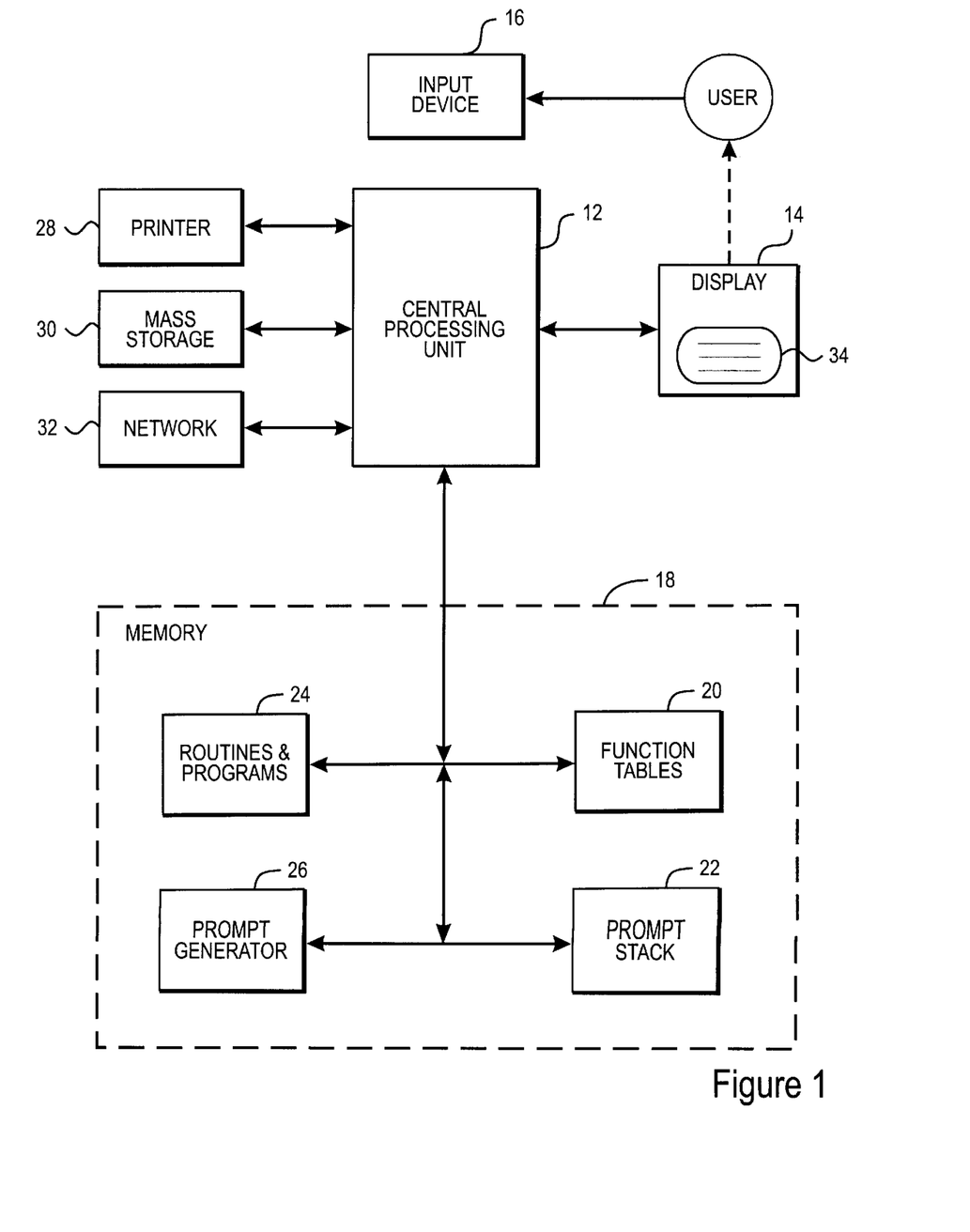
FIG. 1 is a block diagram of a preferred embodiment for the context sensitive prompt system of the present invention.

Referring now to FIG. 1, a block diagram of a preferred embodiment for the system of the present invention is shown. The computer system preferably comprises a central processing unit 12, a display device 14, an input device 16 and an addressable memory 18. The central processing unit 12 is coupled to and controls the display device 14 in response to inputs supplied to the processing unit 12 by user manipulation of the input device 16. The processing unit 12 is also coupled to other sources of information including the addressable memory 18, mass storage 30 and a network 32 in a conventional architecture. A printer 28 is preferably coupled to the processing unit 12 to provide an output for information and a source for hard copies of the data.

Figure 11:
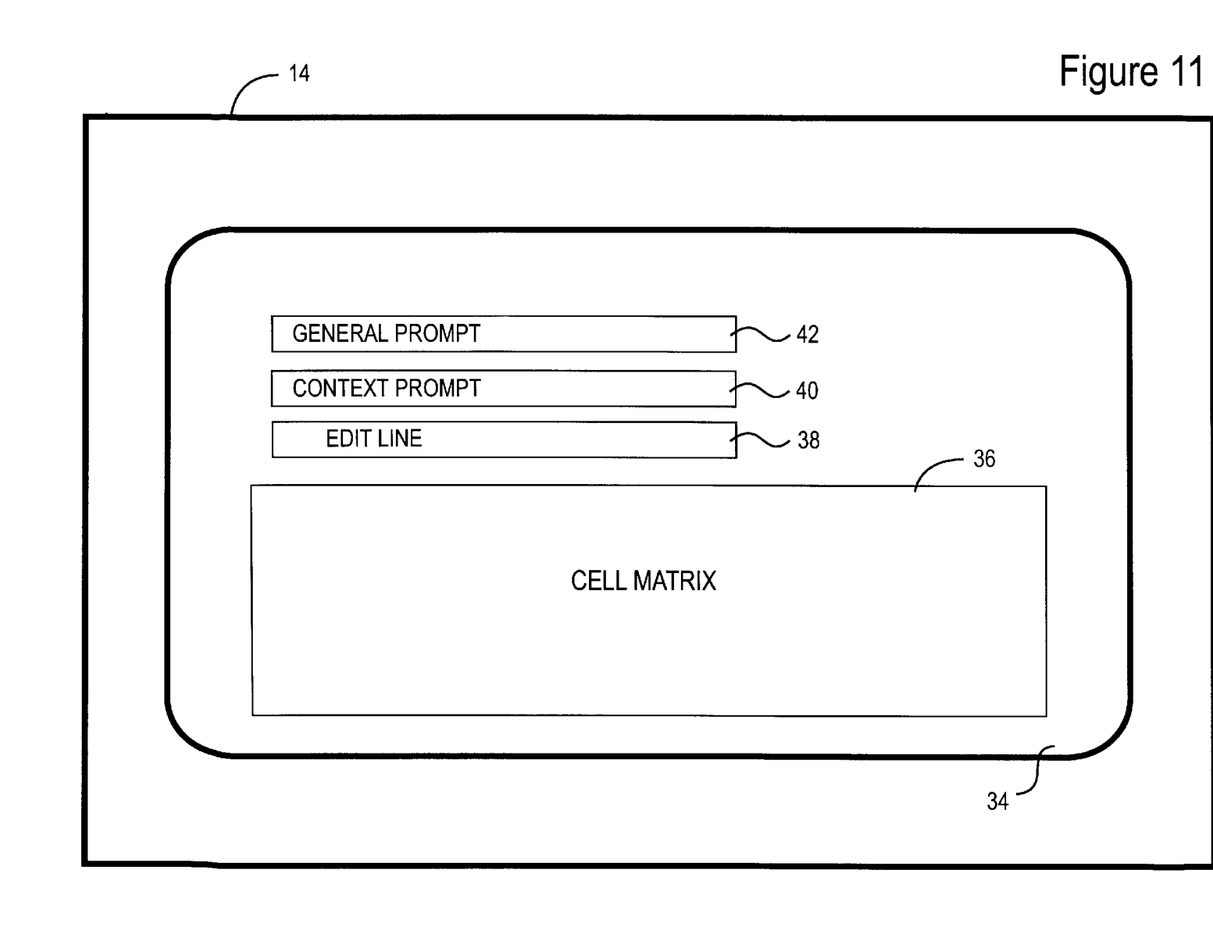
FIG. 11 is a graphic representation of an image of an electronic spreadsheet displayed in accordance with a preferred embodiment of the present invention.

The input device 16 and display device 14 are conventional types as known in the art. For example, the input device 16 is preferably a keyboard with a "mouse" type controller. The display device 14 is preferably a raster-type display used with the processing unit 12 in a conventional manner to produce images of characters generated from codes such as ASCII or graphical images in Windows type systems. As shown in FIG. 11, the preferred embodiment of the display device 14 has a screen 34 that is segregatable into a plurality of viewports 36, 38, 40 and 42. The viewports 36, 38, 40 and 42, provide areas of the display 14 that are readily identifiable to the user as containing the prompts of the present invention. The first viewport 36 provides an area for a matrix of cells as in conventional spreadsheets. The second viewport 38 provides an edit line which displays the underlying formula that produces the value for the current cell highlighted in the first viewport 36. The present invention also provides a third and a fourth viewport 40, 42 for displaying a context prompt and general prompt information, respectively. The present invention preferably positions the third viewport 40 directly above the viewport 38 for the edit line. The third viewport 40 preferably displays context prompt information that shows the correct syntax for the function invocation being input or edited in the edit line 38. If a constant formula (a literal value) is being entered the third viewport 40 remains blank, and if a non-constant formula is being entered and the cursor is not within the context of any function invocation then the string "Cell Formula" is displayed. The positioning of the context prompt 40 is preferably directly above or below the edit line 38 which allows the user to easily compare the format of the data being input to the correct format in viewport 40. The fourth viewport 42 provides an area for a general prompt containing information describing the value of the function invocation being input or edited. While FIG. 11 shows viewports 38, 40 and 42 above the matrix of cells 36 it should be understood that the viewports may be positioned in a variety of different ways. For example, viewports 38, 40 and 42 may be positioned below the matrix of cells 36. The display device 14 also operates in a conventional manner with the input device 16 and the processing unit 12 to produce a cursor on the display device 14 that reflects the location where data will be input into the string in the edit line shown on the display device 14.

The addressable memory 18 further comprises: function tables 20, a prompt stack 22, a prompt generator 26 and processing routines and programs 24 for interactive display control. The memory 18 is a conventional type and preferably includes Random Access Memory and Read Only Memory. The function tables 20 are preferably a plurality of look up tables of information such as the number of parameters, parameter names, function names, general prompts, position. For example, there may be four function tables 20: a function name table, a parameter name table, a function prompt table and a parameter count table. The function name table is a look up table of the function ID number and the function token or name. The parameter name table is a look up table of the function ID number and an associated parameter number and parameter name. Thus, if a function has three parameters, there would be three entries in the parameter name table with the same function ID number, three different parameter numbers (consecutive integers starting with 1) and an associated parameter name corresponding to each parameter number. The function prompt table is a look up table of function ID numbers and associated prompts describing the value and operation of the function. The parameter count table is preferably a look up table of the function ID number and an associated type of function and a number of parameters. The present invention provides different prompts for two different kinds of functions. There are "normal" functions that require a predetermined number of parameters of specified types. There are also "list" functions that will accept an arbitrary number of undifferentiated parameters. By using a function identification number, the function tables 20 are used by the prompt generator 26 to produce the information sent to the display device 14.

The prompt stack 22 is used to temporarily store information about the function invocation being edited or input as part of the cell formula. A record with a function ID, a parameter number and the number of parentheses outstanding can be written (pushed) or read (popped) from the prompt stack 22. A record of information about each function invocation is pushed onto the stack 22 as the tokens of the formula entered for a particular cell in the spreadsheet are scanned. The prompt stack 22 can then be used to indicate the function invocation and parameters currently active at the cursor position. The prompt stack 22 is then used by the method of the present invention to track the cursor position and the function being edited. The prompt generator 26 is used along with the routines and programs 24 by the processing unit 12 to produce and display prompts on display device 14. The prompt generator 26 includes the instructions for using the prompt stack 22 and the function tables 20 to produce a string for display as the context prompt. The prompt generator 26 is preferably a software routine stored in memory 18. The prompt generator 26 also includes the instructions for producing the general prompt.

The processing unit 12 accesses information and instructions in memory 18 for processing information in accordance with the operating sequences of the present invention. The processing unit 12 produces signals for displaying images of a spreadsheet on the display device 14, as illustrated in FIG. 11. The image on the display device 14 preferably has a plurality of segregated viewports 36, 38, 40 and 42 for displaying data related to operations and functions being performed by the spreadsheet. In a preferred embodiment, the central processing unit 12 is a microprocessor such as an 80386 microprocessor made by Intel. The processing unit 12 uses the routines and programs 24 to store, retrieve, modify and display data in the form of an electronic spreadsheet such as Quattro Pro made by "Borland International." In particular, the processing unit 12 uses the signals from the routines 24 to produce a matrix of cell values for data in the first viewport 36 and a formula for the editing line in the second viewport 38. The editing line displays the formula used to calculate the value shown in the cell in the first viewport 36. Moreover, the present invention includes other routines 24, described below, for displaying a general prompt and a context prompt in the third viewport and forth viewport, respectively.

The method of the present invention preferably uses the position of the cursor and the string in the edit line 38 to produce the general prompt and the context sensitive prompt. In the preferred embodiment, the general and context prompts are produced and updated whenever movement of the cursor is detected. The cursor moves in response to the direction keys or mouse of the input device 16, or whenever data is input which automatically moves the cursor one space to the right. Once cursor movement has been detected, the preferred method scans the edit line 38 which contains the formula of the cell being displayed in the first viewport 36. The edit line 38 is preferably scanned from its beginning to the position of the cursor. Based on this scan of the string before the cursor on the edit line 38, the method produces the general prompt and the context sensitive prompt using the prompt generator 26, the function tables 20, the prompt stack 22 and the programs and routines 24. The prompts are then illustrated on the display device 14 in the appropriate viewport 40, 42.

While generation of the general and context sensitive prompts will now be discussed with reference to functions in spreadsheets, it should be understood that one skilled in the art may use the present invention to produce context sensitive prompts for macros, formulae and other operations in spreadsheets and other application programs.

Figure 2:
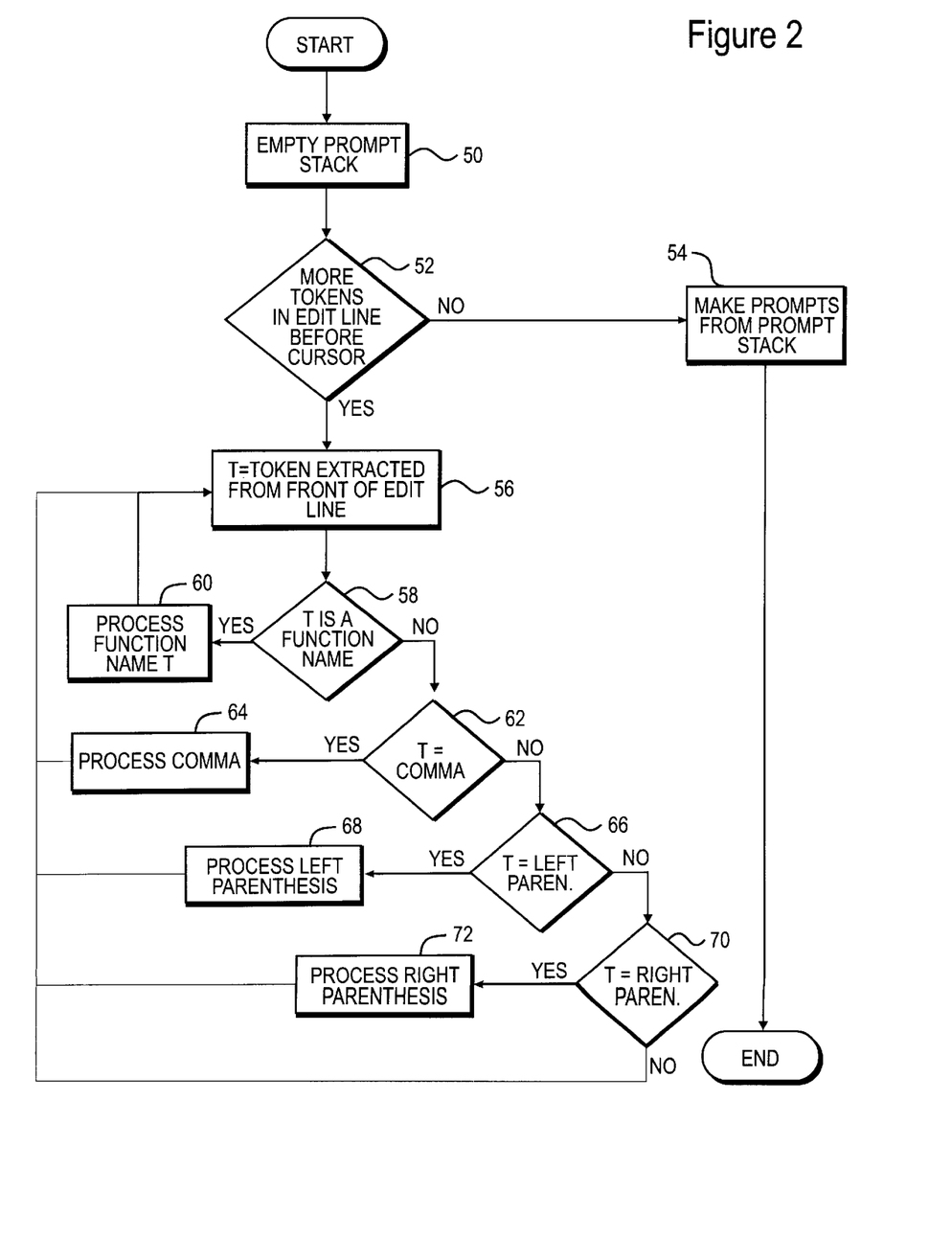
FIG. 2 is a flowchart of a preferred method of the present invention for generating a context sensitive prompt.

Referring now to FIG. 2, a flowchart of the preferred embodiment of the prompt generator 26 for producing context sensitive prompts is shown. Once the cursor position has been identified and the contents of the edit line have been scanned and converted into tokens, the present invention generates and displays the context prompt. The method begins in step 50 where the prompt stack 22 is cleared or emptied. The prompt stack 22 is used to identify the function invocation and parameter which the next token on the edit line would define, if it were not a punctuation token. In step 52, the method determines whether there are any more tokens in the edit line before the cursor. The tokens comprise a finite set of identified symbols (e.g., +, =, -, ") ") and groups of symbols including function names and cell coordinates. If there are no more tokens before the cursor, then the prompt stack 22 reflects the function invocation in force at the position of the cursor and the general and context prompts may be generated by proceeding to step 54. After the completion of step 54 the process is complete and ends. On the other hand, if there are more tokens in the edit line 38 before the cursor, then the prompt stack 22 does not identify the current position of the cursor and the remaining tokens must be processed and before the prompts may be generated. The method proceeds to step 56 where the token at the front of edit line 38 is retrieved and the variable T is set equal to the token retrieved. In step 58, the method tests whether the token retrieved is a function name (e.g., T is a function name). If T equals a function name, the token is processed in step 60 and the method loops to step 52 until there are no more tokens in the edit line before the cursor. Similarly, the method tests whether T equals a comma, left parenthesis and right parenthesis in steps 62, 66 and 70, respectively. If T is found to be equal to comma, left parenthesis or right parenthesis then the token in processed in steps 64, 68 and 72 respectively, and the process loops to step 52 to process any remaining tokens in the edit line before the cursor. In step 70, if the process is not equal to the right parenthesis then the method returns directly to step 52 without further processing of the token.

Figure 3:
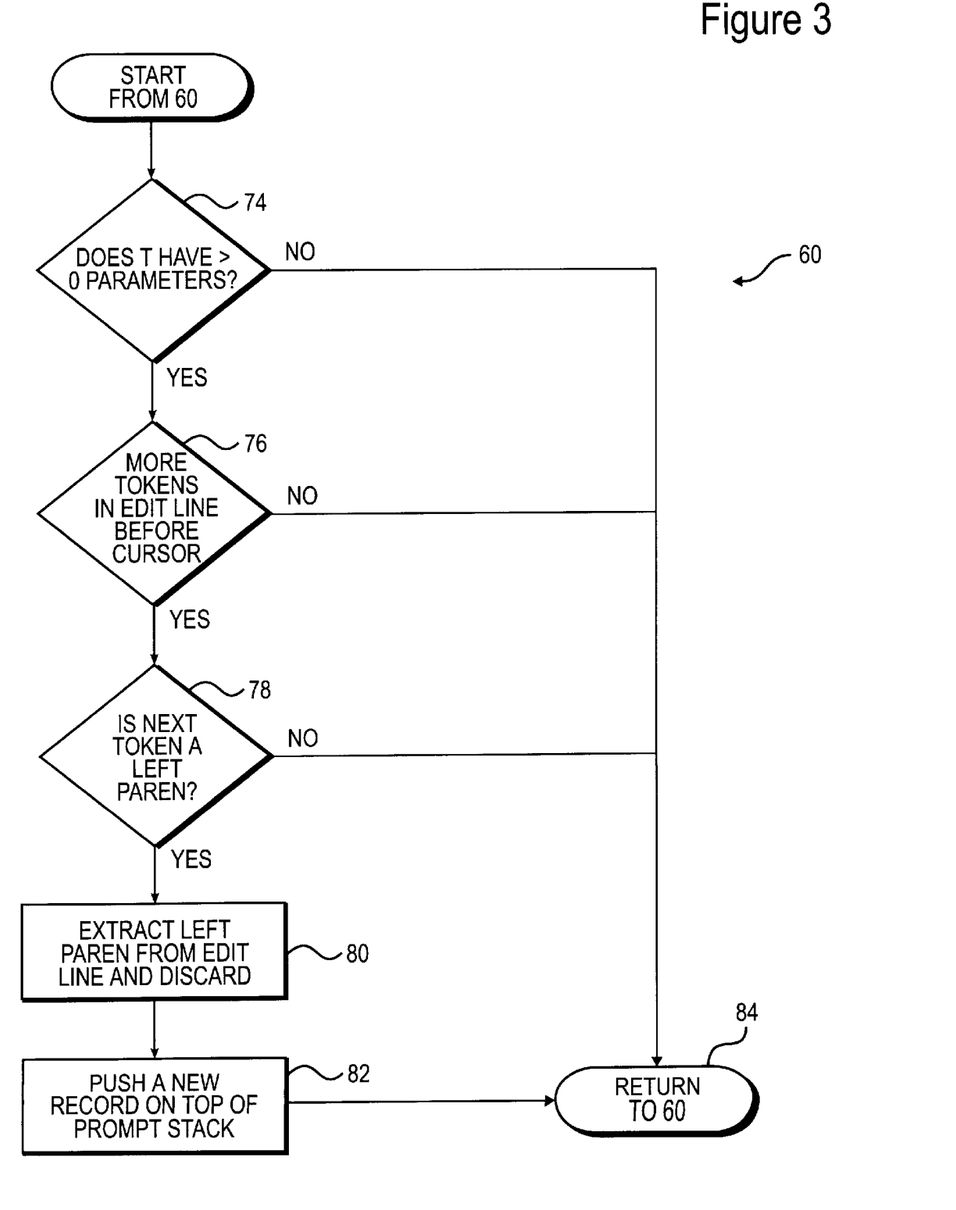
FIG. 3 is a flowchart of a preferred method for processing function names on the edit line and storing a record of the function invocation on the prompt stack.

Referring now to FIGS. 3–6, the processing of the tokens in steps 60, 64, 68 and 72 will be described in more detail. FIG. 3 illustrates the processing if the token is a function name. The preferred method for processing a function name starts in step 74 by determining whether the function named by T has greater than zero parameters. A comparison of T to the function name table yields a function ID number that can then be used to determine the number of parameters using the parameter count table. If the function does not have greater than zero parameters then the process returns in step 84. Otherwise, the preferred method proceeds to step 76 where the method tests whether there are any more tokens in the edit line before the cursor. If not, then the process returns in step 84. If there are more tokens in the edit line, the method tests whether the next token is a left parenthesis in step 78. The correct syntax in the preferred embodiment requires that a function name be followed with the parameters enclosed in parentheses. If a left parenthesis is not the next token then the syntax does not identify a function and the method returns in step 84. However, if a left parenthesis is the next token, then a function is being input or edited in the edit line 38 and the process continues in step 80. In step 80, the parenthesis is retrieved from the edit line 38 and discarded. Next, in step 82 a record with an ID number corresponding to the function name T, the parameter number set equal to 1 and the parenthesis outstanding count set to 1 is pushed on the top of the prompt, stack 22. The parameter number is set to 1 since the next non-punctuation token scanned will be part of the definition of the first parameter of the function named by T since the left parenthesis has just been retrieved and discarded. Similarly, the parenthesis outstanding count is set to 1 since a right parenthesis to match the left parenthesis discarded in step 80 is the only one required to complete the function invocation. The processing for a token that is a function name is then complete and the process returns in step 84.

Figure 4:
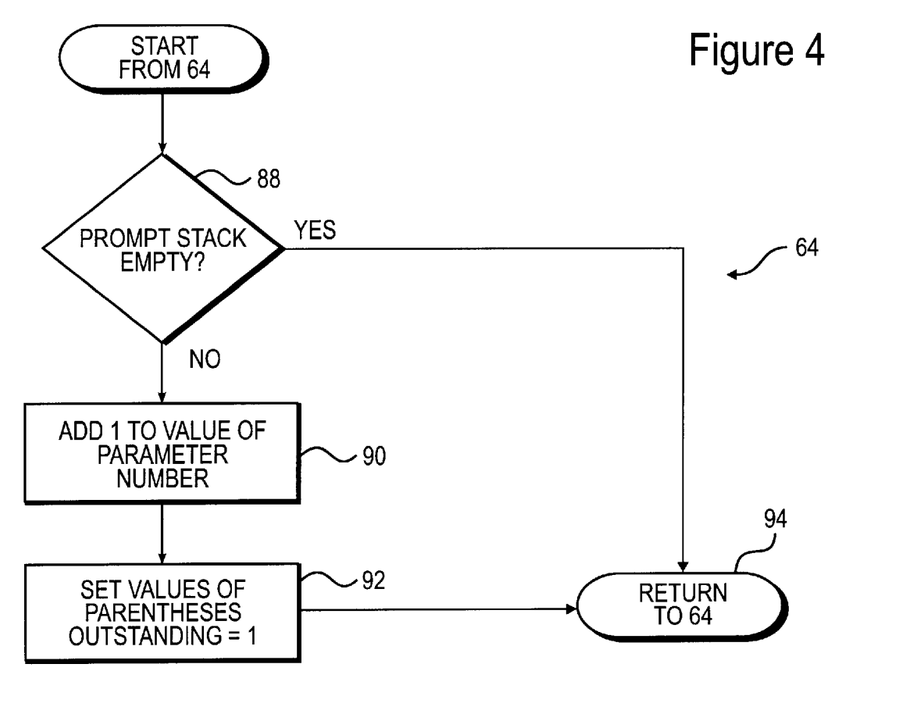
FIG. 4 is a flowchart of a preferred method for processing a comma and modifying the prompt stack.

Referring now to FIG. 4, the preferred method for processing a comma in the edit line 38 is illustrated. The process begins by determining whether the prompt stack 22 is empty. If the prompt stack 22 is empty, the comma has no significance since there no function invocation currently active at this point of the scan. Thus, the process returns in step 94. If the prompt stack 22 is not empty, then a function invocation is active and the comma indicates that the next non-punctuation token scanned will be the part of the definition of the next parameter of the function invocation described by the record on the top of the prompt stack 22. The method proceeds to step 90 where the parameter number on the top of the stack 22 is incremented to indicate that the next non-punctuation token refers to the next parameter of the function invocation. The process continues in step 92 to set the value of the parentheses outstanding equal to 1 since now only one right parenthesis is required to complete the function. Any left parenthesis within the definition of a parameter must be matched within the definition of that parameter, i.e., before the comma. A parameter definition containing an unmatched left parentheses is not well formed and and the offending parentheses will be ingnored for the purpose of generating prompts. Then the method returns in step 94.

Figure 5:
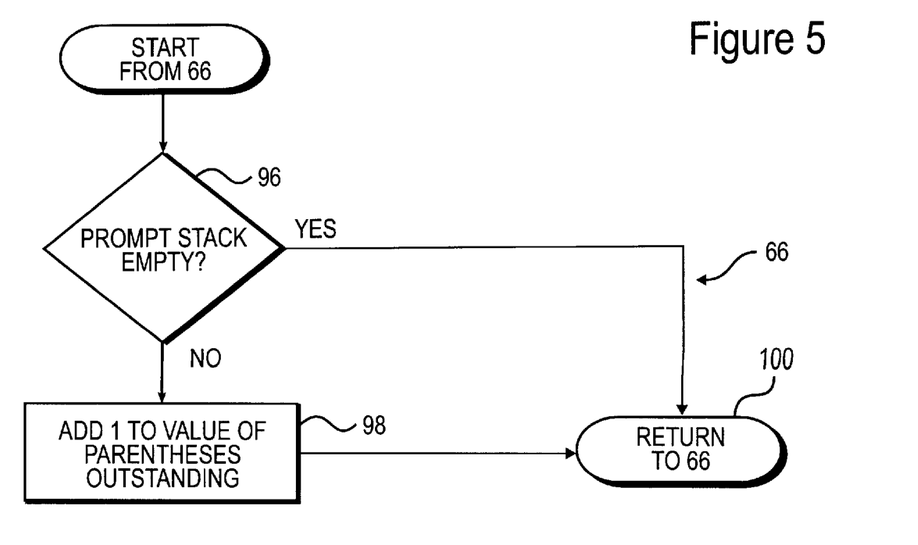
FIG. 5 is a flowchart of a preferred method for processing a left parenthesis and modifying the prompt stack.

Referring now to FIG. 5, the preferred method for processing a left parenthesis is illustrated. The process begins similar to the comma processing by determining whether the prompt stack 22 is empty in step 96. If the prompt stack 22 is empty then no function invocation is active and the process returns in step 100. However, if the prompt stack 22 is not empty then the parameters of a function are being scanned and the preferred method continues to step 98. In step 98, the parentheses outstanding count on the top of the prompt stack 22 is incremented by 1 indicating that another right parenthesis is required to complete the current function invocation. After the parenthesis outstanding has been incremented the process returns in step 100.

Figure 6:
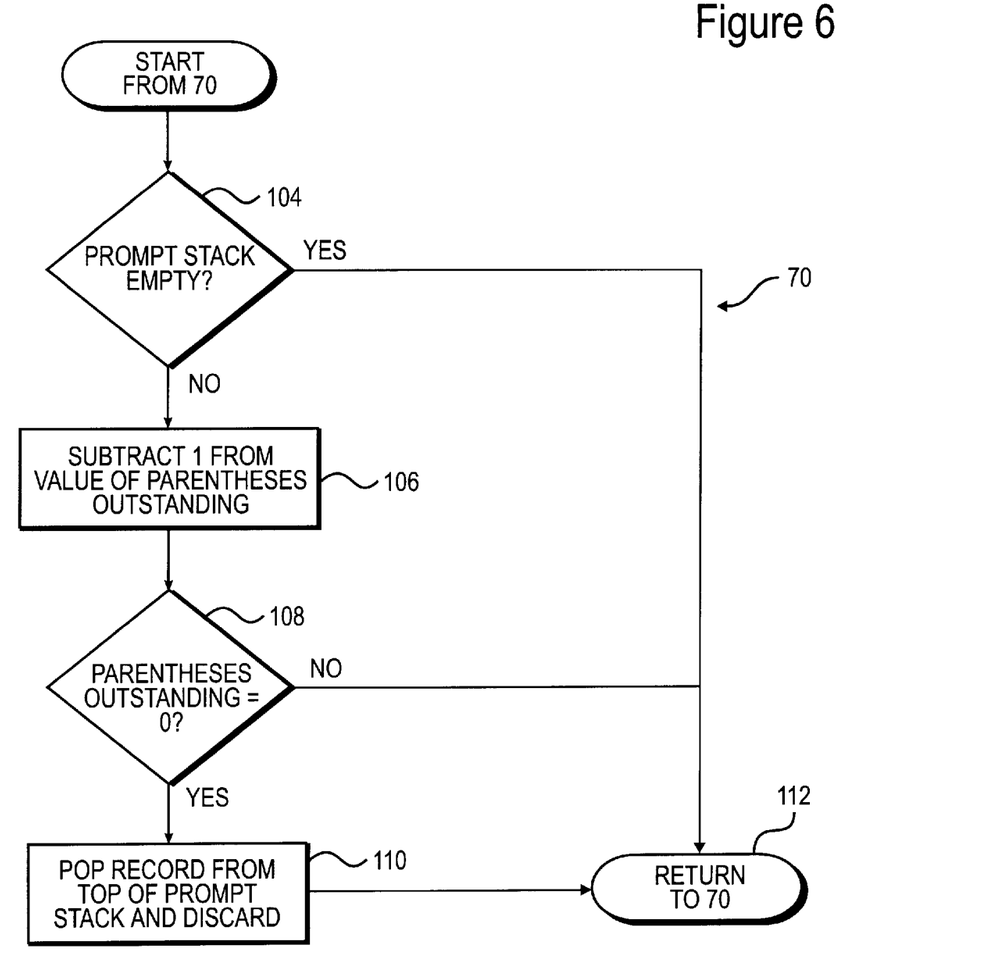
FIG. 6 is a flowchart of a preferred method for processing a right parenthesis and modifying the prompt stack.

FIG. 6 shows the preferred method for processing a right parenthesis in the edit line 38. Similar to the other token processing methods of FIGS. 4 and 5, the method begins by testing whether the prompt stack 22 is empty in step 104. If the prompt stack 22 is empty, the process returns in step 112. If the prompt stack 22 is not empty, then step 106 is performed. In step 106, 1 is subtracted from the value of the parentheses outstanding count for the record on the top of the prompt stack 22, indicating that one less parenthesis is required to complete the currently active function invocation. Then in step 108, the preferred process compares the value of the parentheses outstanding count for the record on the top of the prompt stack 22 to zero. If the parentheses outstanding count is not equal to zero, the process returns in step 112. However, if the parentheses outstanding count is equal to zero then the parenthesis retrieved from the edit line 38 was the closing parenthesis for the current function invocation. The process then pops the top record from the top of the prompt stack and discards the record in step 110 since the function invocation to which that record corresponds is now completed. The process then returns in step 112.

Once all tokens before the cursor position have been processed, then the record on the top of the prompt stack 22 corresponds to the function invocation and parameter within that invocation currently being edited by the user. The process illustrated in FIG. 2 then proceeds to step 54 to generate and display the prompts corresponding to the context (e.g. position) of the cursor. Step 54 is illustrated in more detail by the process of FIG. 7 and the sub-processes of FIGS. 8–10.

Figure 7:
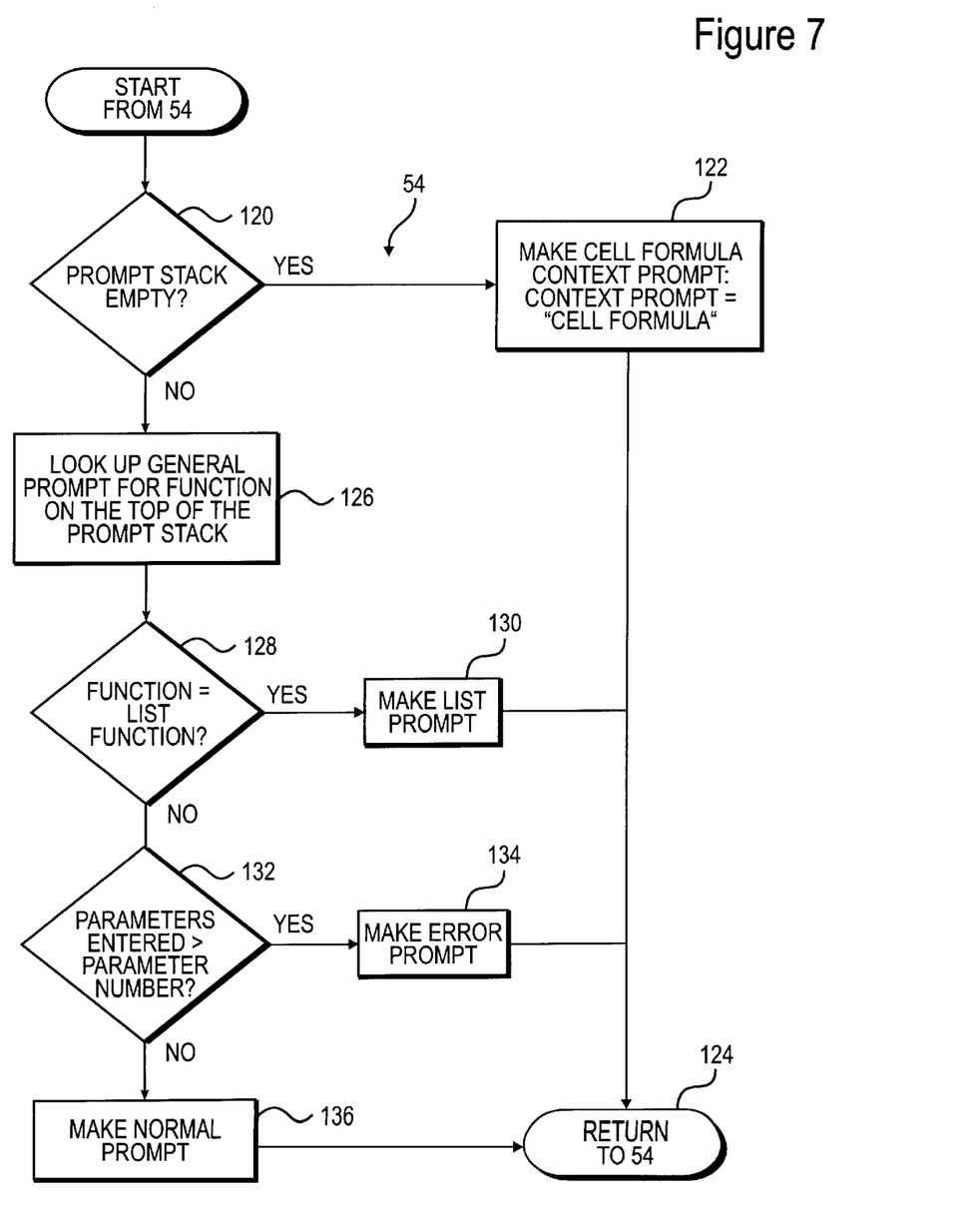
FIG. 7 is a flowchart of a preferred method for constructing and displaying the prompts on the display device.

As shown in FIG. 7, the process for making and displaying the context and general prompts begins with step 120. In step 120, the method of the present invention tests whether the prompt stack 22 is empty. If the prompt stack 22 is empty, then the cursor is not within a function invocation and the method proceeds to step 122. In step 122, the cell formula context prompt is made and displayed in the third viewport 40 on the display device 14. The context prompt equals "Cell Formula" and this string is printed in on the display device 14. Nothing in the context prompt is highlighted and no general prompt is generated. On the other hand, if the prompt stack 22 is not empty then the cursor position indicates that the user is inputting or editing a function invocation and the process moves to step 126. In step 126, the general prompt is generated and displayed in the fourth viewport 42 on the display device 14. The general prompt is generated using the function ID for the record on the top of the prompt stack 22. From this function ID the general prompt may be looked up in the function prompt table. Once the general prompt has been created and displayed the context prompt is generated. The process moves to step 128 to test whether the function on the top of the prompt stack 22 is a list function. The function ID for the record on the top of the prompt stack 22 and the parameter count table may be used to determine the type of function and determine if it is a "list" type function. If the function is a "list" type function then the method proceeds to step 130 where the list type prompt is generated and displayed as will be discussed in more detail below with reference to FIG. 8. The process then returns in step 124.

If the function is not a list function then the process tests whether the number of parameters is greater than the number of parameters needed for the function in step 134. The parameter number for the record on the top of the stack reflects the number of parameters entered since it is incremented each time a comma (the symbol that separates parameters) is retrieved from the edit line. The number of parameters for the function can be determined by using the function ID for the record on the top of the stack and the parameter count table which lists the number of parameter for each function. If there are more parameters entered than the number of parameters for the function being invoked, then the user has made an error when entering the function or its parameters. An error message is created and displayed in the third viewport 40 for the context prompt in step 134 and the process returns in step 124. If the number of parameters entered are not greater than the parameter number then the normal prompt for the function on the top of the prompt stack is generated in step 136 and the process return in step 124.

Figure 8:
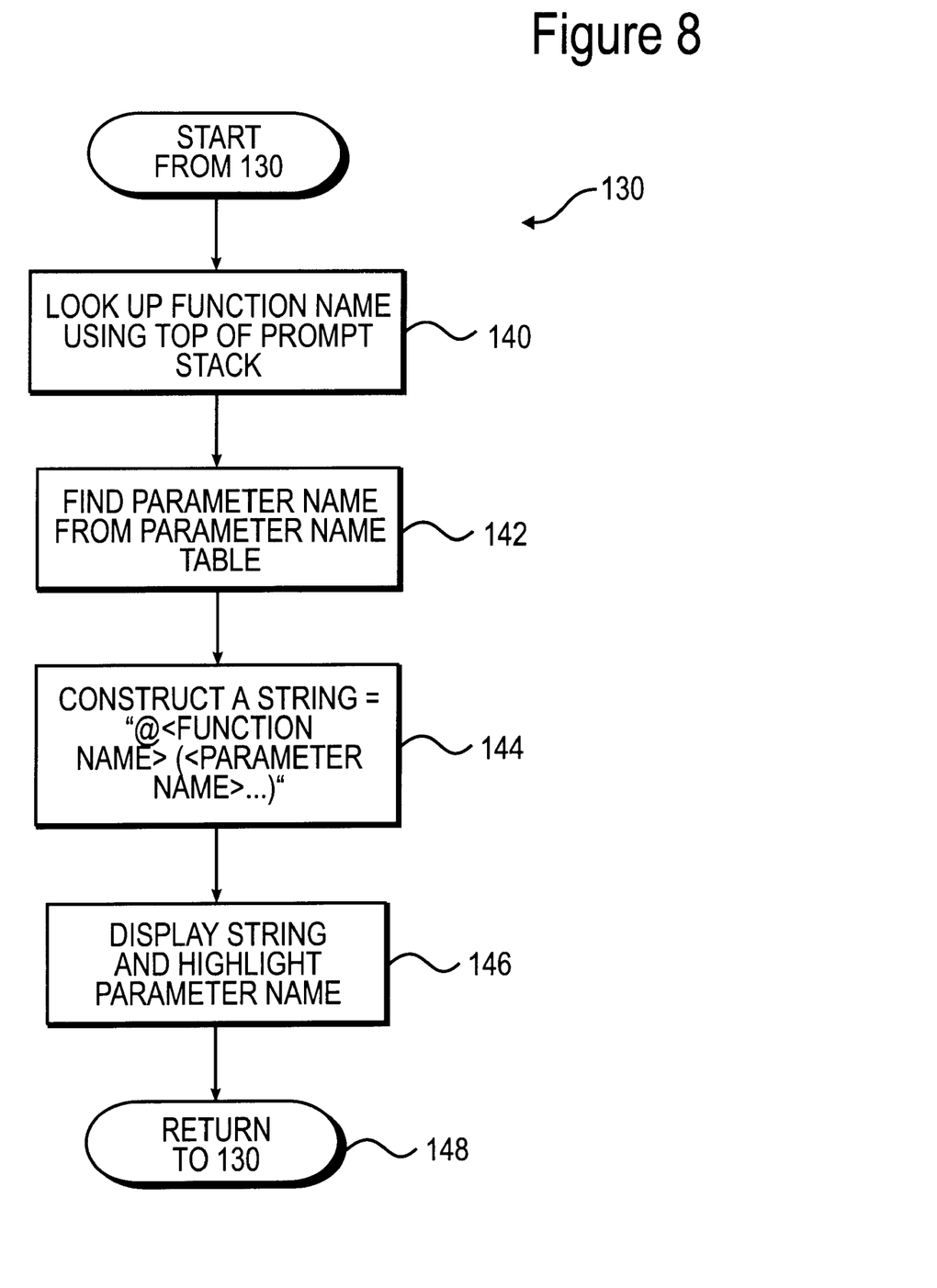
FIG. 8 is a flowchart of a preferred embodiment of a method for creating and displaying the list prompt.

FIG. 8 shows the preferred process for making the list prompt as discussed above with reference to step 130. The list prompt is created by looking up the function name using the record on the top of the stack in step 140. The function name is derived from the function name table using the function ID from the record on the top of the prompt stack 22. In step 142, the parameter name for the function ID of the record on the top of the stack 22 is looked up in the parameter name table. Since list functions have parameters all of the same type only a single parameter name must be looked up. By setting the parameter value to 1 the name of the parameter can be derived from the table. Then in step 144 a string of the function name and the parameter name is constructed. In an exemplary embodiment, the string is as follows: "@[function name]([parameter name] . . . )" where the [function name] and the [parameter name] are replaced by the information retrieved in steps 140 and 142, respectively. The process then moves to step 146 where the string is displayed in the third viewport 40 and the parameter name is highlighted. The process then returns in step 148.

Figure 9:
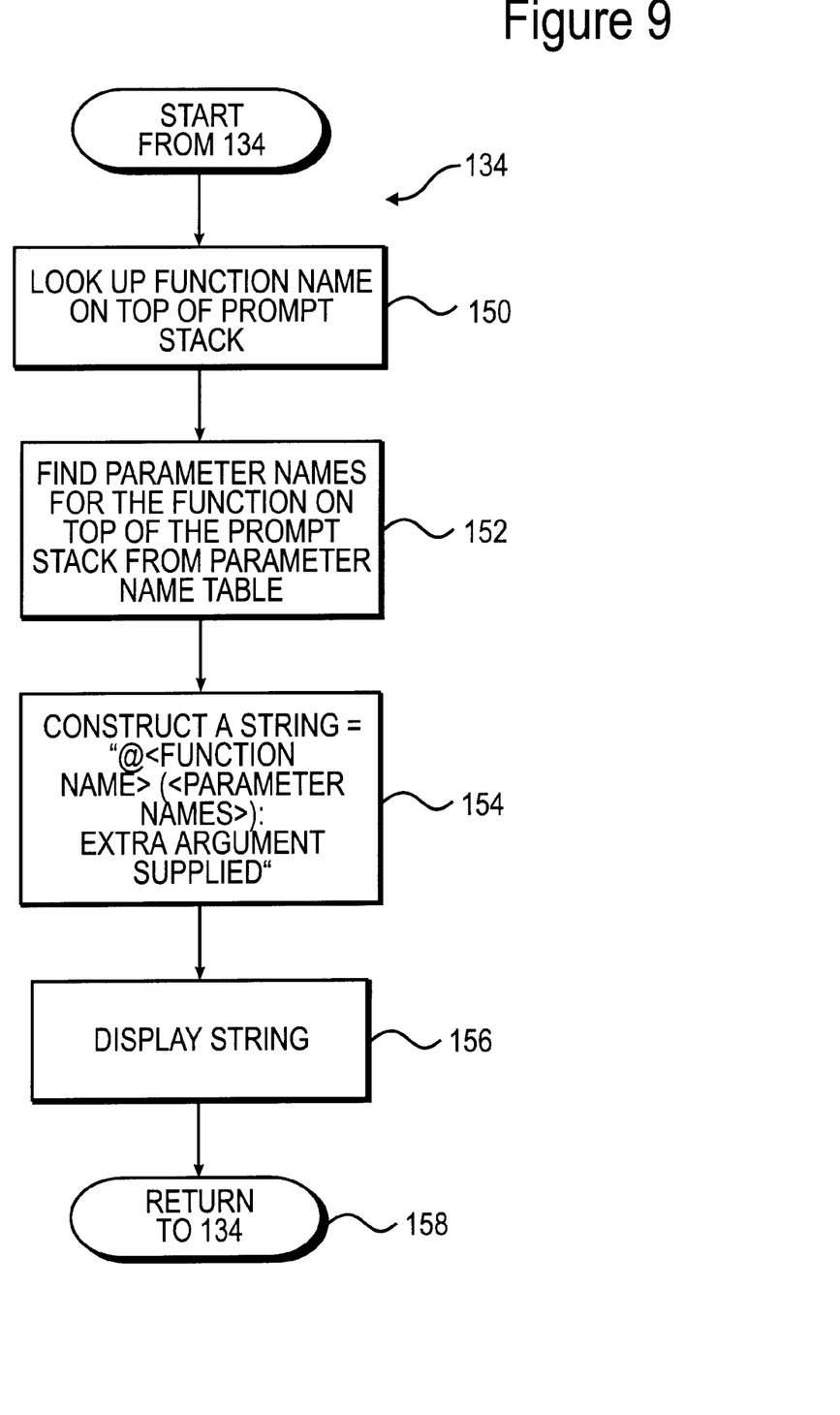
FIG. 9 is a flowchart of a preferred embodiment of a method for creating and displaying the error prompt.

Referring now to FIG. 9, a preferred method for constructing the error prompt of step 134 is shown. The first step in constructing the error prompt, step 150, looks up the function name for the record on the top of the prompt stack 22. Then in step 152, each parameter name for the function ID on the top of the stack 22 is derived from the parameter name table. Using pairs made up of the function ID from the top of the prompt stack 22 and every integral number from 1 to the number of parameters for the function are used to look up the parameter names in the parameter name table. The method then constructs the error string in step 154. For example, the error string may be as follows: "@[function name]([parameter 1 name][parameter 2 name] . . . [parameter n name]): Extra arguments supplied" where the [function name] is replaced by the information retrieved in step 150, and the [parameter 1 name][parameter 2 name] . . . [parameter n name][parameter name] are replaced by the parameter names looked up in step 152. Parameter names are separated by commas. The process then moves to step 156 where the string is displayed and returns in step 158.

Figure 10:
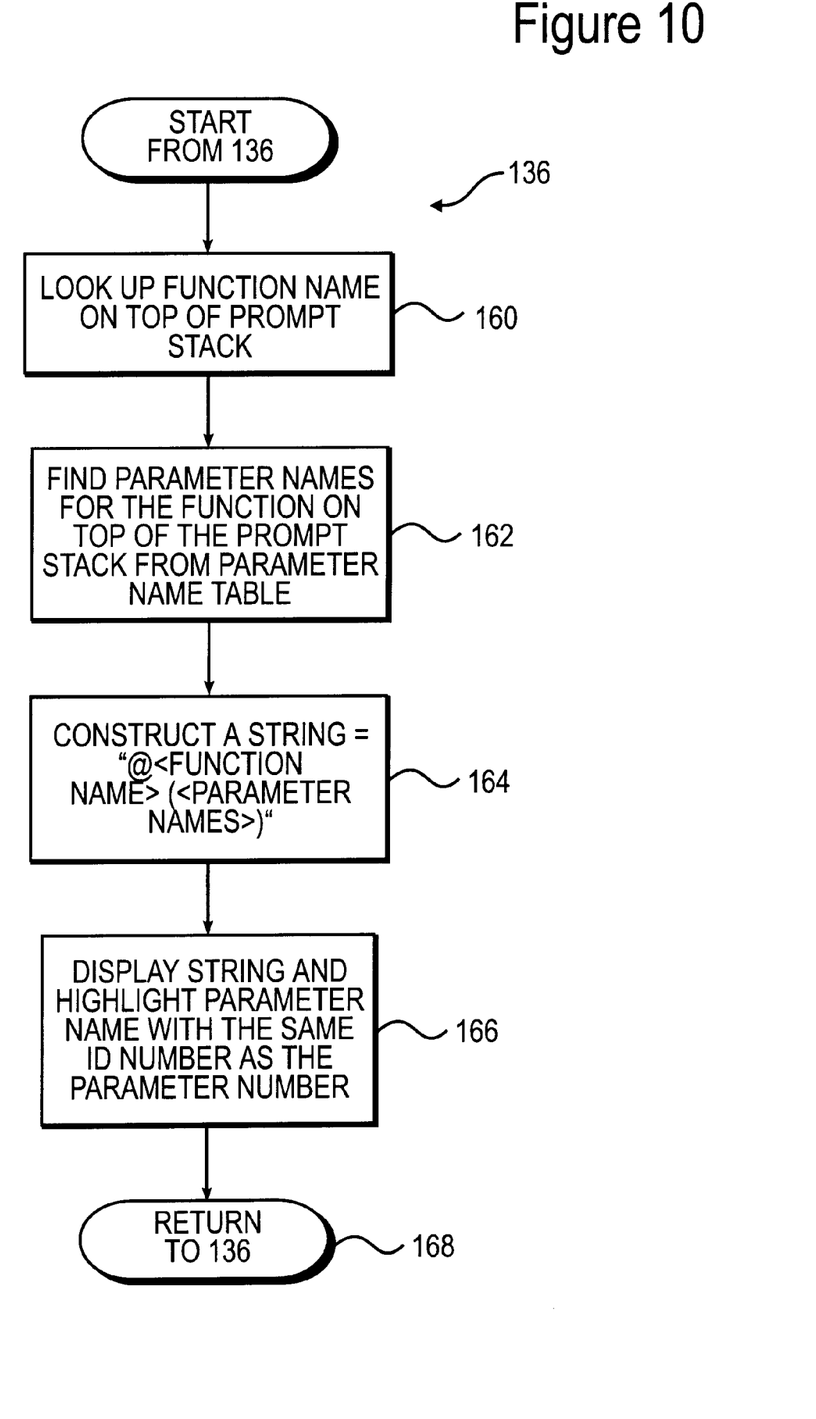
FIG. 10 is a flowchart of a preferred embodiment of a method for creating and displaying the normal context prompt.

Finally, FIG. 10 illustrates the preferred process for making the normal context prompt. The process starts by looking up the function name in step 160 similar to steps 140 and 150. Then in step 162, the parameter names are looked up in the parameter name table similar to step 152 discussed above. Next, in step 164, a string of the function and parameter names is constructed. For example, the string is as follows: "@[function name]([parameter 1 name][parameter 2 name] . . .[parameter n name])" where the [function name] is replaced by the information retrieved in step 160, and the [parameter 1 name][parameter 2 name] . . . [parameter n name][parameter name] are replaced by the parameter names looked up in step 162. Parameter names are separated by commas. Then the string of step 164 is displayed in the third viewport 40 of the display device 14. The present invention advantageously highlights the display of the parameter name with the same number as the parameter number for the record on the top of the stack. Thus, the parameter that is presently being edited or input is highlighted by the context prompt to prevent errors and assist the user when function are being edited.

What is claimed is:

1. A method for providing context sensitive prompts for aiding a user of a computer system, said method comprising the steps of:

indicating on a display device a sequence of input data entered by the user which specifies at least one function to be performed by the system, wherein said at least one function returns a value serving as a parameter for another function;

placing a screen cursor at a selected position within said sequence of input data;

retrieving a portion of the input data preceding the selected position;

storing a record for each function present in said retrieved portion of the input data and whose entry has yet to be completed by the user, said step of storing a record further comprising the step of pushing a record on a memory stack for each function retrieved with said portion of the input data;

providing a context sensitive prompt based upon which record is stored last, said last stored record identifying a function pointed to by said cursor, and said context sensitive prompt giving help information for said identified function; and indicating on the display device the context sensitive prompt.

2. The method of claim 1, wherein said context sensitive prompt includes a selected one of a list prompt, said list prompt having a character string descriptive of said function; an error prompt; and a prompt selected specifically for the identified function and a number of parameters retrieved with said input data.

3. The method of claim 2, wherein the prompt selected specifically for the identified function includes a function name and parameter names for the function.

4. The method of claim 3, wherein a parameter in the prompt corresponding to the cursor position is displayed in a highlighted manner.

5. The method of claim 1, wherein said at least one function comprises a spreadsheet function.

6. The method of claim 1, wherein said input data include a series of characters specifying at least one function, and wherein said retrieving step includes:

retrieving from said series of characters those characters positioned before the selected position; and parsing said retrieved characters into a series of tokens specifying at least one named function and at least one value serving as a parameter to said at least one named function.

7. The method of claim 6, wherein said tokens include characters specifying selected ones of a function name, punctuation characters, and function parameters.

8. The method of claim 7, wherein said punctuation characters include selected ones of "(", ")", and "," characters.

9. The method of claim 1, wherein the step of indicating provides a first region for displaying said input data and a second region for displaying said context sensitive prompt, said first and second regions being aligned to facilitate comparison of the user information with a prompt.

* * * * *